(12) United States Patent
Thomson

(10) Patent No.: US 8,561,995 B2
(45) Date of Patent: Oct. 22, 2013

(54) METAL-TO-METAL ANNULUS SEAL ARRANGEMENT

(75) Inventor: Kenneth D. Thomson, Glasgow (GB)

(73) Assignee: Vetco Gray Inc., Houston, TX (US)

( * ) Notice: Subject to any disclaimer, the term of this patent is extended or adjusted under 35 U.S.C. 154(b) by 536 days.

(21) Appl. No.: 12/796,444

(22) Filed: Jun. 8, 2010

(65) Prior Publication Data

US 2010/0327532 A1 Dec. 30, 2010

Related U.S. Application Data

(60) Provisional application No. 61/221,915, filed on Jun. 30, 2009.

(51) Int. Cl.
*F16J 15/18* (2006.01)

(52) U.S. Cl.
USPC ............................................................ 277/339

(58) Field of Classification Search
USPC .................................... 277/337–339, 603, 609
See application file for complete search history.

(56) References Cited

U.S. PATENT DOCUMENTS

| | | | | |
|---|---|---|---|---|
| 4,131,287 A | * | 12/1978 | Gunderson et al. | 277/328 |
| 4,384,726 A | | 5/1983 | Meyer | |
| 4,531,711 A | * | 7/1985 | Bunch et al. | 251/214 |
| 4,553,759 A | * | 11/1985 | Kilmoyer | 251/214 |
| 4,787,642 A | * | 11/1988 | Etheridge | 277/550 |
| 4,900,041 A | * | 2/1990 | Hopkins et al. | 277/328 |
| 5,044,672 A | * | 9/1991 | Skeels et al. | 285/98 |
| 5,148,870 A | | 9/1992 | Fernandez et al. | |
| 5,224,715 A | * | 7/1993 | Downes et al. | 277/322 |
| 5,246,236 A | * | 9/1993 | Szarka et al. | 277/337 |
| 5,450,904 A | | 9/1995 | Galle | |
| 5,456,314 A | | 10/1995 | Boehm, Jr. et al. | |
| 5,464,063 A | | 11/1995 | Boehm, Jr. | |
| 5,566,761 A | | 10/1996 | Pallini, Jr. et al. | |
| 5,685,369 A | | 11/1997 | Ellis et al. | |
| 5,997,003 A | * | 12/1999 | Turner | 277/339 |
| 6,561,521 B2 | * | 5/2003 | Janoff et al. | 277/603 |
| 6,918,446 B2 | | 7/2005 | Borak, Jr. | |
| 7,770,899 B1 | * | 8/2010 | Durham | 277/603 |
| 2003/0106685 A1 | | 6/2003 | Salama et al. | |
| 2003/0111799 A1 | | 6/2003 | Gilmore | |
| 2008/0203672 A1 | | 8/2008 | Smith | |
| 2008/0308278 A1 | | 12/2008 | Adamek et al. | |

FOREIGN PATENT DOCUMENTS

EP 2006589 A1 12/2008

OTHER PUBLICATIONS

PCT Search Report and Written Opinion issued in connection with corresponding International Application No. PCT/US2010/039468 on Feb. 17, 2011.

\* cited by examiner

*Primary Examiner* — Gilbert Lee
(74) *Attorney, Agent, or Firm* — Bracewell & Giuliani LLP

(57) ABSTRACT

A metal-to-metal seal is used to seal between two tubular members. In one embodiment, a metal-to-metal seal forms a seal in an annulus housing between an inner and outer diameter of tubular members of an adjustable casing sub. The seal can have an inner and an outer sealing ring, or more than one pair of inner and outer sealing rings, that can be set in place by a running tool. An energizing ring can have a tapered or bulbous surface, and can create a pre-load force against the sealing rings.

20 Claims, 6 Drawing Sheets

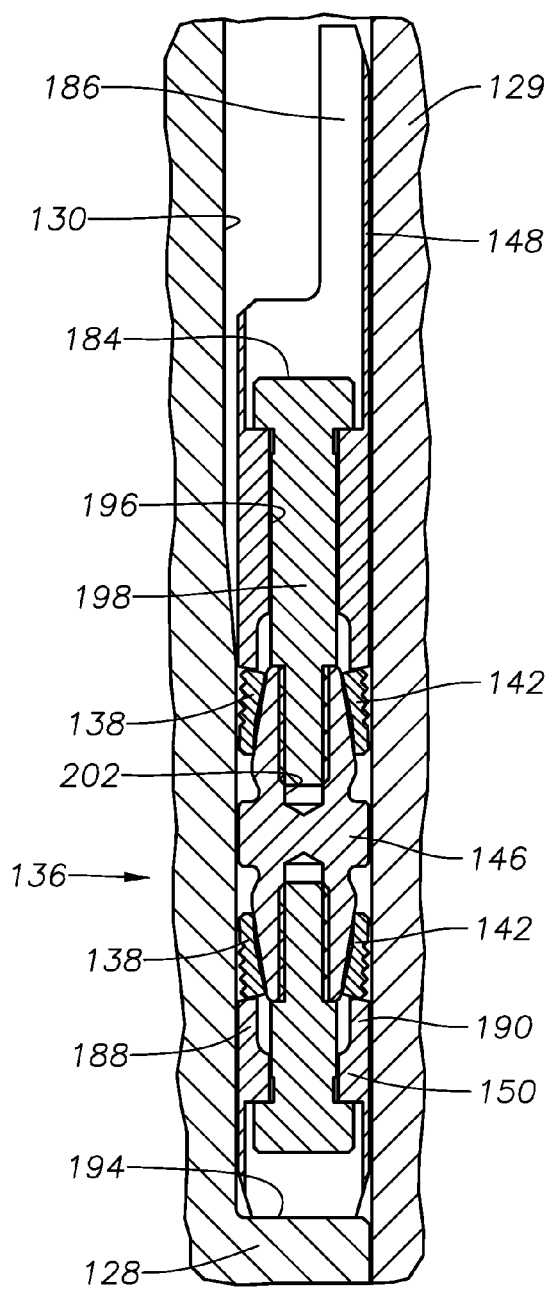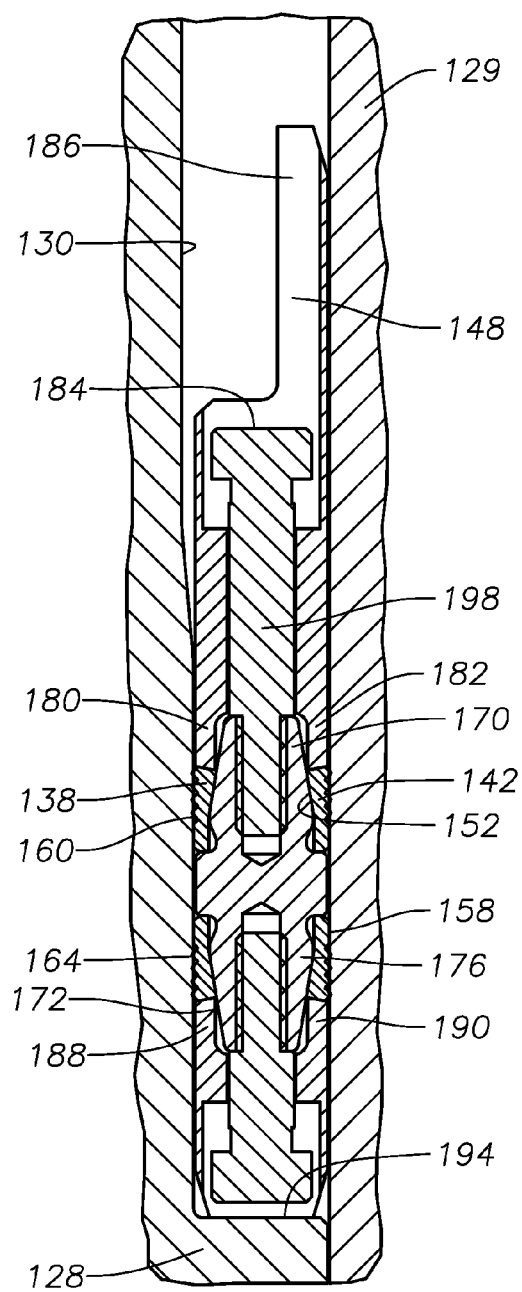

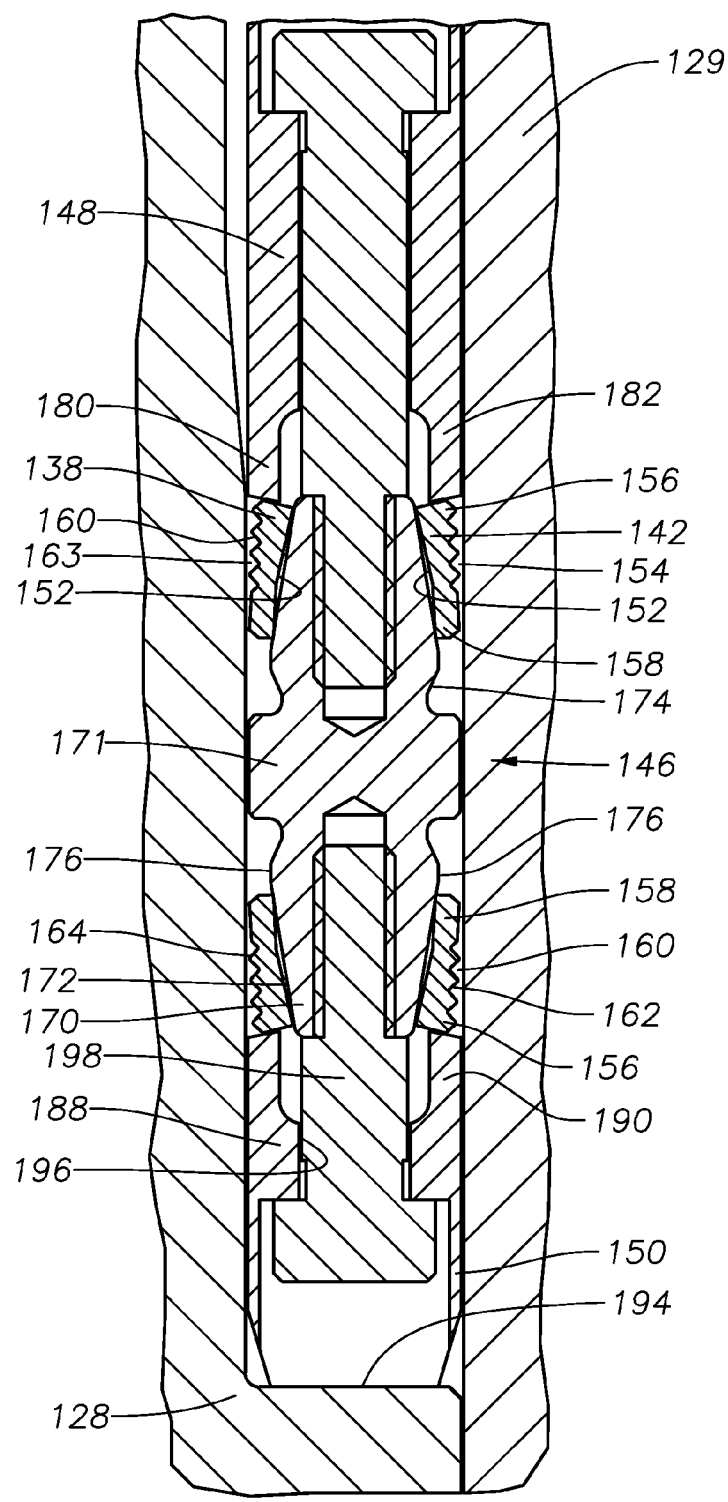
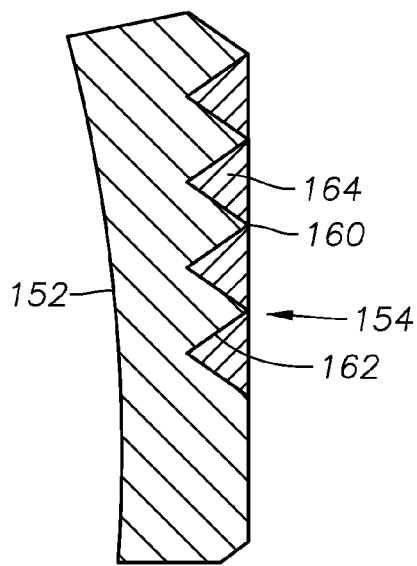
Fig. 5
Fig. 6

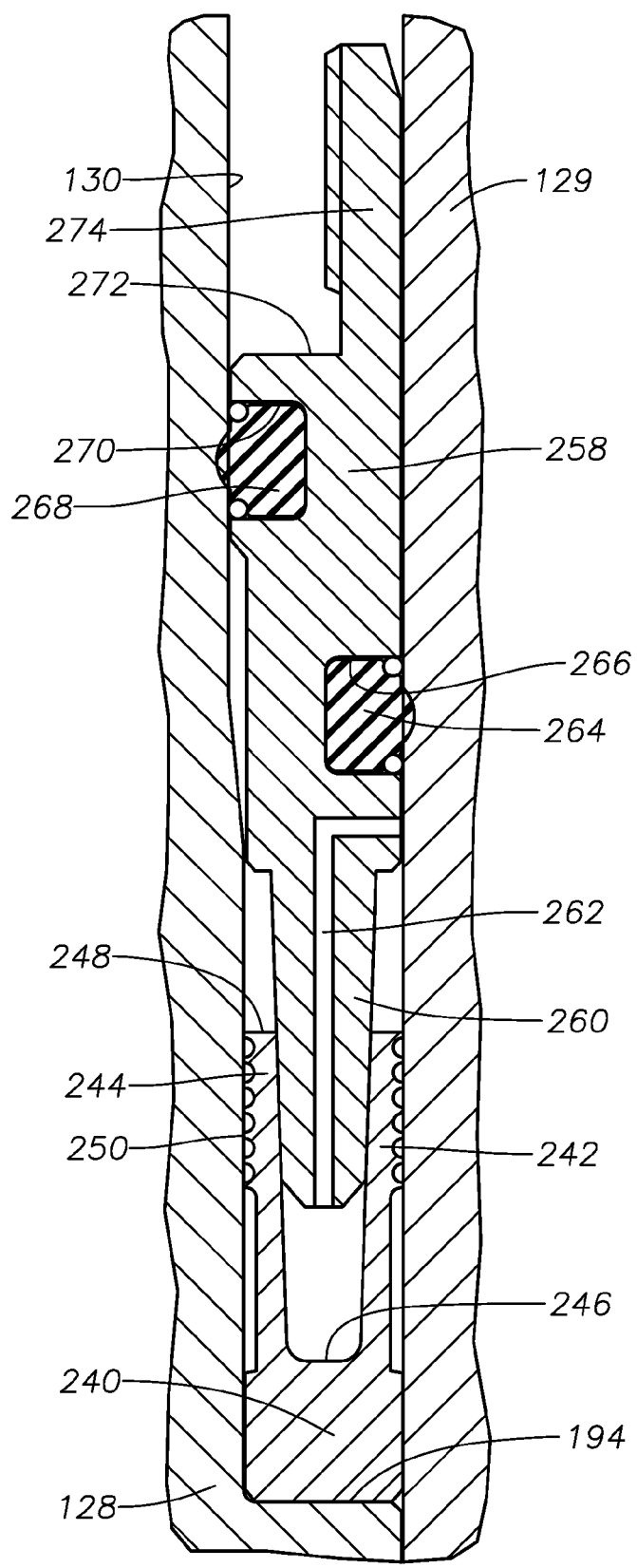
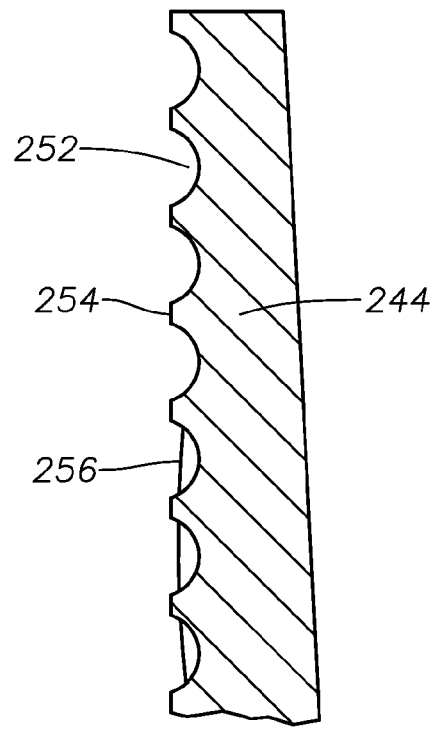
Fig. 10
Fig. 11

METAL-TO-METAL ANNULUS SEAL ARRANGEMENT

CROSS-REFERENCE TO RELATED APPLICATIONS

This application claims priority to provisional application 61/221,915, filed Jun. 30, 2009 and incorporated herein by reference.

BACKGROUND OF THE INVENTION

1. Field of the Invention

The present invention relates in general to a method and apparatus to seal between wellbore members, and in particular to a metal seal used between two members of an adjustable wellbore casing.

2. Brief Description of Related Art

An adjustable casing sub ("ACS") can be used when connecting a drilling platform to an existing wellhead. For example, a "jack-up" or fixed oil and gas platform can be re-connected to a previously installed subsea wellhead or mudline system. The ACS is part of a riser assembly that provides for an adjustable length. The ACS can include two concentrically located tubular members. The tubular members can move axially in relation to each other, and then be sealed together when they are at the desired length.

The tubular members can have a housing annulus, or seal pocket, wherein an annular gap is located between the outer diameter of the inner tubular member and the inner diameter of the outer tubular member. A seal can be placed in the housing annulus. Existing ACS designs use an elastomeric annular seal arrangement, which can have inherent limitations when used in a high pressure or high temperature application.

There are numerous ACS systems in inventory, and thus it is not practical to redesign the housing annulus itself to use a seal that is more compatible with high pressure and high temperature environments. Therefore, it is desirable to have a metal seal that can work within the existing housing annulus design and form a seal between the metallic tubular members.

SUMMARY OF THE INVENTION

In one embodiment, the seal assembly can include two pairs of seal elements mounted in opposing directions to provide a seal against pressure within a housing annulus, from both directions. The seal elements can have spherical internal profiles that match an identical spherical surface on the seal energizing ring, the external profile being machined to form an angular surface that has a series of radial grooves that contain a lubricating plating or inlay of softer material to ensure seal reliability after axial movement of the seal that occurs when the seal is set. The seal elements can be dimensioned such that during running and setting operations, they are not in contact with their associated seal surfaces.

A running tool can axially move a traveling sleeve that is part of the ACS seal assembly. In one embodiment, the running tool can rotate and the radial motion can be transferred to axial, or longitudinal, motion of the traveling sleeve. The seals can be energized by the vertical load imposed by the adjustment of the traveling sleeve. The vertical load can drive the individual seal elements over the spherical surface on the energizing ring and setting seal element such that the angular external profile makes contact with the corresponding surfaces on the ACS. This contact can generate stored energy which can result in elevated contact stress on both internal and external faces of the seal elements sufficient to create a metal-to-metal seal. The pre-load can be generated, and maintained, by way of adjustment of the traveling sleeve positioned above the seal assembly.

In another embodiment, the seal assembly includes two pairs of seal lips mounted in opposing directions. Each pair of seal lips can form a u-shaped seal arrangement to provide sealing of pressure, within the annulus, from both directions. The seal lip external profile can be machined to form an angular surface which has a series of radial grooves that contain lubricating plating or inlay of softer material to ensure seal reliability after axial movement of the seal that occurs during setting. The seal elements can be dimensioned such that there is an angular radial interference with the corresponding seal surface. Energizing rings can have a tapered profile that is driven between the u-shaped seal members during setting. Longitudinal travel of the seal element, in relation to the energizing rings, can cause angular deflection of the seal lips, thus causing the seal lips to engage the inner and outer tubular members of the ACS. The angular deflection can radially compress the seal lips and generate stored energy which results in elevated contact stress sufficient to create a metal-to-metal seal.

After the ACS is run and set in place, additional pre-load can be generated and maintained by way of adjustment of a traveling sleeve positioned above the seal assembly. Longitudinal travel of the sleeve can generate load by way of torque applied through an ACS running and setting tool. The vertical load can compress the upper and lower seal energizing rings until contact is made between the tapered surfaces on the internal profile of each seal lip and a corresponding taper on the energizing rings. The contact can generate additional stored energy which can result in additional contact stress on both internal and external faces of the seal elements sufficient to maintain a metal-to-metal seal during production operations.

In one embodiment, the seal assembly can include a pair of seal lips that forms a u-seal arrangement to provide sealing of pressure, within the annulus, from both directions. The seal lip external profile can be machined to form a parallel surface which can have a series of radial grooves that contain a lubricating plating or soft inlay of softer material to ensure seal reliability after axial movement of the seal, in relation to the tubular members, during setting of the seal. The internal profile of the seal lips can have a "self holding" taper profile that corresponds with a similar profile on the energizing ring. As with the other embodiments, the seal elements can be dimensioned such that during running and setting operations of the ACS, they are not in contact with the associated seal surfaces of the tubular members. A running tool can generate rotational or longitudinal force, which can be transferred to longitudinal force associated with a traveling sleeve connected to the seal assembly.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 4 is a sectional view of an exemplary embodiment of a metal-to-metal seal in the adjustable casing sub of FIG. 3, shown prior to setting.

FIG. 5 is an enlarged detailed sectional view of the metal-to-metal seal of FIG. 4, shown prior to setting.

FIG. 6 is a detail view of the sealing surface of the metal-to-metal seal of FIG. 5.

FIG. 7 is a sectional view of the metal-to-metal seal of FIG. 4, shown in an energized position.

FIG. 10 is a sectional view of yet another exemplary embodiment of a metal-to-metal seal in the adjustable casing sub of FIG. 3.

FIG. 11 is a detail view of the sealing surface of the metal-to-metal seal of FIG. 10.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
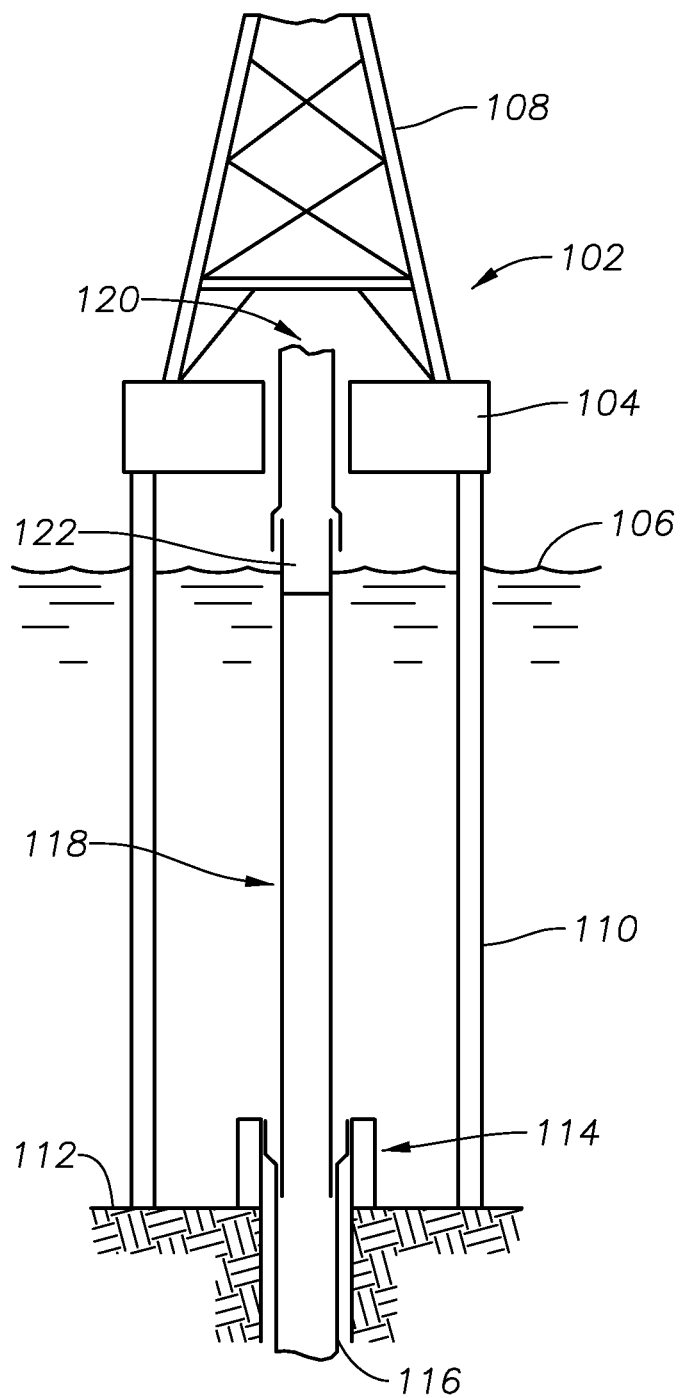
FIG. 1 is a side view of an offshore rig with a casing string extending to the seafloor, the casing string having an adjustable casing sub.

Referring to FIG. 1, offshore rig 102 is shown in a side view. The offshore rig 102 comprises a platform 104 situated above the level of the sea 106 with a derrick structure 108 attached to the top of the platform 104. Support legs 110 extend from the bottom of the platform and attach on the sea floor 112. A subsea wellhead 114 is formed over a wellbore 116. A tieback casing string 118 extends upward from the subsea wellhead and is coupled with a surface wellhead 120 that is within the platform 104 of the offshore rig 102. In line with the casing string 118 is an adjustable casing sub 122. As is known, insertion of the adjustable casing sub 122 can adjust the length of the casing string 118 to a predetermined length and can also tension the casing string 118.

Figure 2:
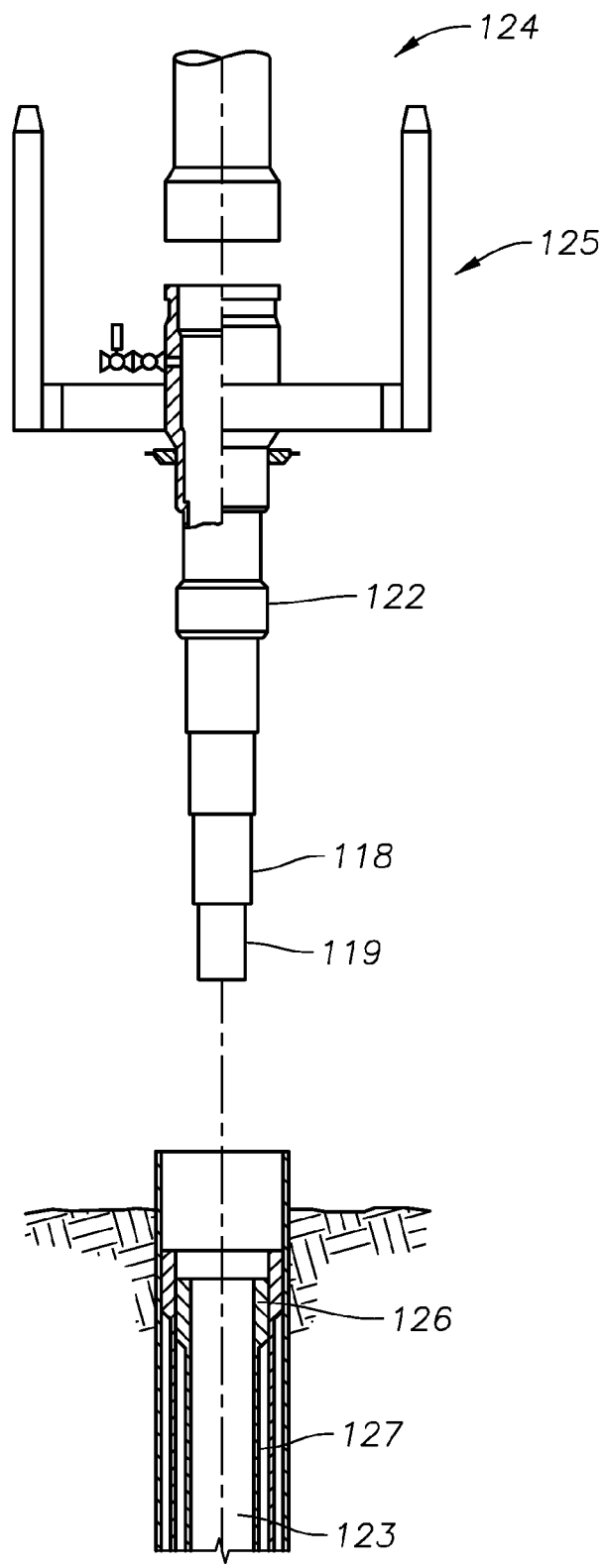
FIG. 2 is a side view of a mud-line suspension system with a casing string extending to a subsea wellhead, the casing string having an adjustable casing sub.

Referring to FIG. 2, wellbore 123 has a wellhead 125 and one or more casing hangers 126, each supporting a string of casing 127, preferably cemented in wellbore 123. Mudline conversion system 124 can be used to convert a previously capped subsea wellbore 123. Mudline conversion system 124 can include adjustable casing sub 122 and casing string 118. Casing string 118 can have tieback 119 located at one end, that can be used to tie back to casing hanger 126. Casing string 118 is lowered into wellhead 125 and latched or tied back through a mudline suspension system to the innermost casing string 127. In line with casing string 118 is adjustable casing sub 122. As is known to one of skill in the art, adjustable casing sub 122 can be used to adjust the length of casing string 118 to a predetermined length and also tension casing string 118.

Figure 3:
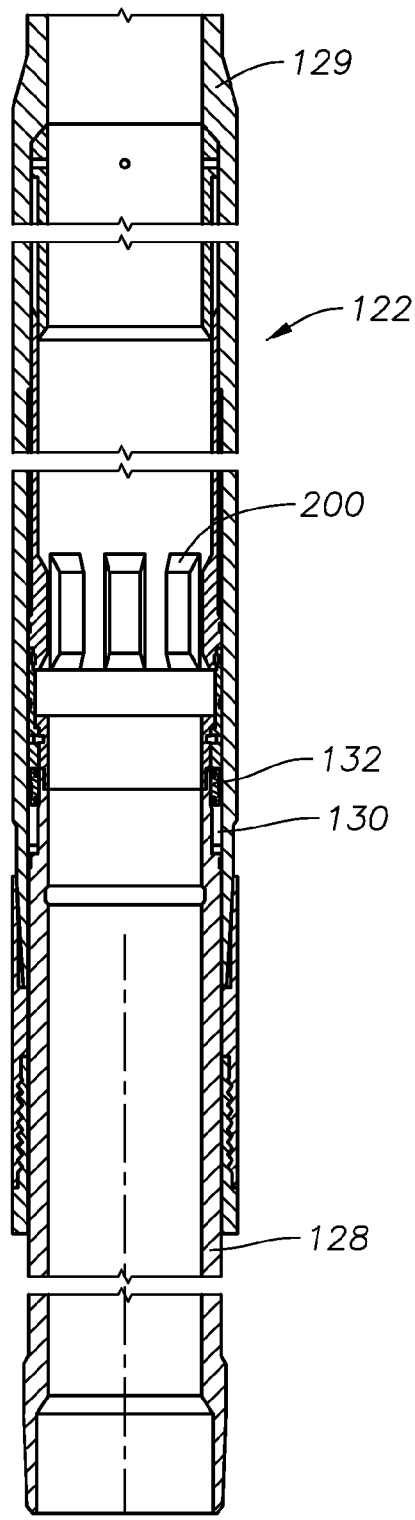
FIG. 3 is a side cutaway view of an embodiment of an adjustable casing sub.

Referring to FIG. 3, adjustable casing sub 122 comprises a generally annular inner housing body 128 that partially coaxially extends into an outer sleeve 129. The outer sleeve 129 has an inner diameter roughly equal to the outer diameter of the inner housing body 128. These respective dimensions allow insertion and telescoping coaxial movement of the inner housing body 128 within the outer sleeve 129. The axial length of casing string 118 may need to be adjusted due to tensioning requirements or variations during installation of casing string 118. Inner housing body 128 is able to slide within outer sleeve 129. Thus the final length of casing string 118 is variable within a predetermined range. A running tool (not shown) may be used to pull tension and set the final length of casing string 118 by making adjustments to the position of inner housing body 128 in respect to the position of outer sleeve 129.

The respective inner and outer diameters of the inner housing body 128 in the outer sleeve 129 form a housing annulus 130 between these two members. The annulus 130 is an annular void with a seal assembly 132 disposed therein. The seal assembly 132 forms a seal against both inner housing body 128 and outer sleeve 129.

Referring to FIG. 4, quad seal assembly 136 is located in housing annulus 130. Quad seal assembly 136 comprises inner sealing ring 138, outer sealing ring 142, bi-directional energizing ring ("BER") 146, upper ring 148, and lower ring 150. Inner sealing ring 138 and outer sealing ring 142 are annular seals concentric about an axis. There are two inner sealing rings 138 and two outer sealing rings 142. The sealing rings 138, 142 are made of metal, such as, for example, low carbon steel. Other types of metal may be used.

Referring to FIG. 5, each outer sealing ring 142 is an annular member having an inner surface 152 and an outer sealing surface 154, the outer sealing surface 154 being spaced outwardly from the inner diameter. Prior to setting, the outer surface 154 of outer sealing ring 142 may be parallel to the axis of the bore of outer sealing ring 142, or outer surface 154 may be at an incline in relation to the bore (as shown). In some embodiments, in its relaxed state, a first end 156 of outer surface has the smallest diameter, and the diameter gradually increases along the axial length of the outer surface to second end 158. The largest outer diameter of outer sealing ring 142 is initially slightly smaller than the inner diameter of outer sleeve 129. Thus, prior to being energized, outer sealing ring 142 is able to pass through outer sleeve 129 without engaging outer sleeve 129.

Referring to FIGS. 5 and 6, each outer sealing ring 142 may have a plurality of ridges 160 on outer surface 154. Ridges 160 are parallel, circumferential ribs formed with the body of outer surface. Ridges 160 are separated by grooves 162, each groove 162 forming a valley between ridges. In some embodiments, grooves 162 are filled, or partially filled, by a soft metal lubricating plating or inlay 164. Inlay 164 has a lower hardness than outer sealing ring 142 and thus is likely to deform and flow when outer sealing ring 142 is pressed against an adjacent surface. Inlay 164 could be made of a soft material such as, for example, lead and tin.

Inner surface 152 of outer sealing ring 142 is generally smooth. Inner surface 152 may have a slightly rounded or concave shape or may be flat. Furthermore, inner surface 152 may be parallel to the axis of outer sealing ring 142 or may have a general incline from a widest point at one end to a narrowest point at the other end. A soft metal coating may cover inner surface 152 to act as a lubricant when BER 146 presses against and slides along inner surface 152.

Inner sealing ring 138 may be an annular ring with an inner sealing surface 163, and may be a dimensional mirror-image of outer sealing ring 142. Inner sealing ring 138 may have ridges 160 on its inner diameter and a smooth surface 152 on its outer diameter. Like outer sealing ring 142, inner sealing ring 138 may have a soft metal inlay 164 in grooves 162 between ridges 160, or a soft metal coating on any of its surfaces.

Bi-directional energizing ring ("BER") 146 is an annular ring concentric with the axis of outer sleeve 129. The cross section of BER 146 is symmetric across a horizontal line, drawn perpendicular to the axis of rotation, that bisects the BER 146. Some embodiments are also symmetric across a vertical line that bisects the cross section from a first end to a second end. A forcing cone 170 extends from each end of energizing ring body 171. Forcing cones 170 can be driven between inner sealing ring 138 and outer sealing ring 142. Forcing cone 170 is a rib rotated about the axis of BER 146. Forcing cone 170 comprises inner sloped surface 172 and outer sloped surface 174, wherein the inner and outer sloped surfaces each have a tapered profile that gradually converges at a point farthest from body 171 of BER 146. In some embodiments, forcing cone 170 has a spherical or bulbous shape, wherein, while moving from the axial midpoint of the BER toward the end, the inner and outer diameter of forcing cone gradually diverge towards a bulbous point 176 having maximum outer diameter and minimum inner diameter, and then converge back towards the end of forcing cone 170.

The axial midpoint of BER 146 may have a cylindrical shape having a larger outer diameter than the widest point of forcing cone 170, and may have a smaller inner diameter than the smallest point of forcing cone 170. Thus the cylindrical shape may serve to center BER 146 in the housing annulus 130 prior to engaging inner sealing ring 138 and outer sealing ring 142.

Upper ring 148 is an annular ring concentric with the axis of outer sleeve 129. The lower end of upper ring is a u-shaped cavity defined by inner leg 180 and outer leg 182. The outer diameter of outer leg 182 is slightly smaller than the inner diameter of outer sleeve 129. Similarly, the inner diameter of inner leg 180 is slightly larger than the outer diameter of inner housing 126. The gap between the inner leg 180 and outer leg 182 is slightly larger than the width of forcing cone 170 at its minimum width end. The depth of the u-shaped gap is at least equal to the axial length of forcing cone 170 minus the axial length of inner sealing ring 138 and outer sealing ring 142. In other words, the length of inner leg 180 plus the length of inner sealing ring 138 is at least as great as the axial length of forcing cone 170. In the run-in position of FIG. 5, the ends, or end surfaces, of legs 180, 182 contact the ends of inner and outer sealing rings 138, 142.

Referring back to FIG. 4, upper ring 148 may have one or more horizontal shoulders 184. Upper ring 148 may have an upper threaded portion 186 extending upward from shoulder 184, having an outer diameter that is slightly smaller than the inner diameter of outer sleeve 129 and an inner diameter that is greater than the lower portion of upper ring 148. The inner diameter of threaded upper portion 186 may have threads for threadingly engaging a sleeve within adjustable casing sub 172 (FIG. 3).

Lower ring 150, which can be a stationary ring relative to inner housing body 128, is an annular ring rotated about the axis of the bore. Lower ring has a u-shaped gap defined by inner leg 188 and outer leg 190, similar in dimensions to inner leg 180 and outer leg 182 of upper ring 148. In the run-in position of FIG. 5, the ends of legs 188, 190 contact lower sealing rings 138, 142. The bottom end of lower ring 150 may be a flat surface for engaging a shoulder 194 on inner housing. BER 146, upper ring 148, and lower ring 150 may be made of metal.

Upper ring 148 and lower ring 150 may have bolt holes 196 for receiving bolts 198. Bolt holes 196 may be parallel to the axis of the bore and radially spaced around the rings 148, 150. Bolt holes 196 may have a counterbore for receiving the heads of bolts 198. The depth of counterbore is at least as long as the axial length of forcing cone minus the axial length of seals. BER 146 may have threaded holes 202 for threadingly engaging bolts 198, threaded holes 202 in BER 146 corresponding to bolt holes 196 in upper and lower rings 148, 150.

Quad seal assembly 136 is created by placing two pairs of inner sealing rings 138 and outer sealing rings 142 on the upper and lower forcing cones 170 of BER 146. Lower ring 150 is bolted to BER 146 by bolts 198 such that the inner and outer legs 188, 190 of lower ring 150 hold the inner and outer sealing rings 138, 142, respectively, in place. Similarly, upper ring 148 is bolted to BER 146 by bolts 198 such that the inner and outer legs 180, 182 of upper ring 148 hold inner and outer seals 138, 142, respectively, in place.

In operation, quad seal assembly 136 is placed in annulus 130 (FIG. 3) of adjustable casing sub 122, which is attached to a running tool (not shown). As will be appreciated by one of skill in the art, attachment may be by lugs, threads, snap ring, dogs, or any other means. The running tool will fix the desired length of adjustable casing sub 122.

Referring to FIGS. 3 and 5, with inner housing body 128 properly located within outer sleeve 129 and quad seal assembly 136 located in housing annulus 130, compressive force is exerted on quad seal assembly 136 to energize sealing rings 138, 142. In an exemplary embodiment, the running tool (not shown) causes downward force to be exerted on upper ring 148. Downward pressure may be created, for example, by rotating a drill string (not shown) and using threads (not shown) to convert rotational force to linear force in the axial direction. Torque keys 204 (FIG. 3) may engage parts of running tool to prevent quad seal assembly 136 from rotating during energization. Other methods may be used to energize quad seal assembly. Hydraulic pistons on a running tool (not shown), for example, may exert downward pressure on seal assembly 136 or simple downward force from the weight of casing string or tubing may be transferred to quad seal assembly 136. Other types of attachment may be used to engage upper ring 148. One of skill in the art will appreciate that upper ring 148 can be compressively engaged by other wellbore members without the use of a running tool.

Referring to FIG. 7, downward force on upper ring 148 causes inner and outer legs 180, 182 to exert force on inner and outer sealing rings 138, 142. Sealing rings 138, 142 are pushed down relative to upper forcing cone 170 of BER 146. As inner sealing ring 138 is pushed down, the tapered profile of forcing cone 170 pushes inner sealing ring 138 inward to forcibly engage inner housing body 128. Similarly, the tapered profile of forcing cone 170 pushes outer sealing ring 142 outward to forcibly engage outer sleeve 129. Thus the angular deflection of sealing rings 138, 142 causes the sealing surfaces such as inner surface 152 and outer surface 154 to engage the surfaces of inner housing body 128 and outer sleeve 129 with a preload force. Referring to FIG. 4, bulbous point 176 may cause inner and outer seals 138, 142 to press inward and outward against inner and outer housing.

Referring to FIG. 5, downward force is transferred through upper inner and outer sealing rings 138, 142 to BER 146. BER 146 moves down relative to inner housing 126. Lower ring 150 is pressed against shoulder 194, thus preventing lower ring 150 from moving. Lower inner and outer sealing rings 138, 142 engage lower ring inner leg 180 and outer leg 182, thus preventing lower inner and outer sealing rings 138, 142 from moving relative to lower ring 150 and inner housing body 128. Thus BER 146 is forced downward relative to lower inner and outer sealing rings 138, 142. Lower forcing cone 170 exerts inward and outward pressure against sealing rings 138, 142 as BER 146 moves down, causing inner and outer sealing rings 138, 142 to engage inner housing body 128 and outer sleeve 129.

As BER 146 moves down relative to inner housing 126, upper inner and outer sealing rings 138, 142 also move down. Inner and outer sealing rings 138, 142 may be already compressively engaging inner housing body 128 and outer sleeve 129 to some extent at the time they start moving down. Soft metal inlays 164 and cladding on inner and outer sealing rings 138, 142 may provide lubrication for inner and outer sealing rings 138, 142 to slide during movement. In one embodiment, soft metal inlays 164 and cladding on inner and outer sealing rings 138, 142 can facilitate keeping the upper inner and outer sealing rings 138, 142 from setting before the lower inner and outer sealing rings 138, 142 are set. Upper sealing rings 138, 142 and lower sealing rings 148, 142 are set at roughly the same time, but in some embodiments, lower sealing rings 148, 142 are fully set before upper sealing rings 138, 142 are fully set. Due to the nature of having both an upper and a lower set of seals 138, 142, quad seal assembly 136 seals against pressure in both directions.

Bolts 198 used to hold quad seal assembly 136 together during run-in remain fixed in BER 146 when quad seal assembly 136 is energized. Counterbores permit movement of BER 146 relative to heads of bolts 198. Thus bolt 198 head no longer engages upper and lower ring 148, 150 when sealing rings 138, 142 are energized. Compressive forces on quad seal assembly 136 prevent rings from separating and thus bolts 198 are no longer required to hold the assembly together.

Figure 8:
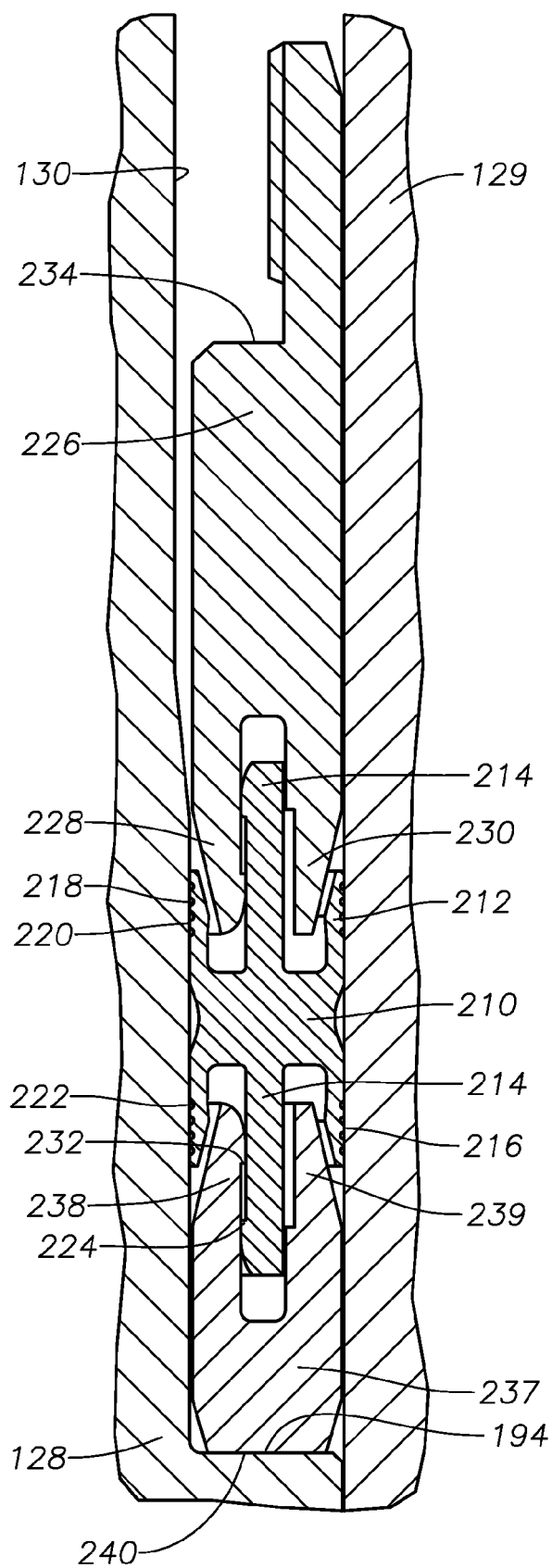
FIG. 8 is a sectional view of another exemplary embodiment of a metal-to-metal seal in the adjustable casing sub of FIG. 3.

Referring to the alternative embodiment of FIG. 8, trident seal 210 is an annular sealing ring, rotated about an axis. Trident seal 210 comprises two pairs of seal lips 212, each pair having an inner seal lip and an outer seal lip and each pair of lips forming a general u-shape, such that there is an annular gap separating them. In some embodiments, the u-shape is bisected by a guide ring 214 protruding from the base of the "u." The axial length of the guide ring 214 is longer than the axial length of the seal lips 212. Trident seal 210 is made of metal.

Figure 9:
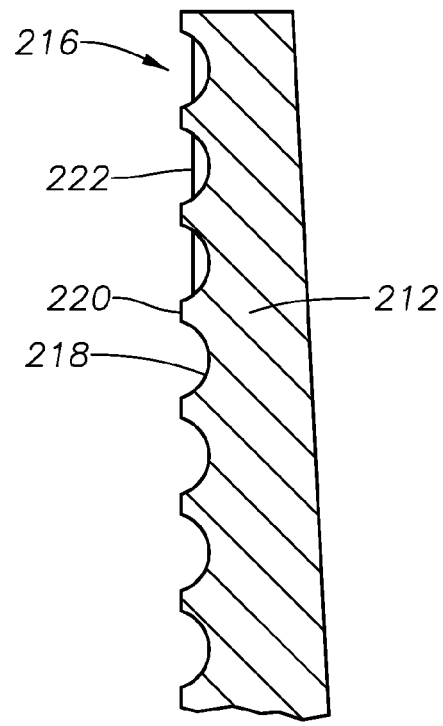
FIG. 9 is a detail view of the sealing surface of the metal-to-metal seal of FIG. 8.

Referring to FIG. 9, each lip 212 has a sealing surface 216. Inner and outer lip sealing surfaces 216 are located on the inner and outer diameter, respectively, of trident seal 210 (FIG. 8). In one embodiment, sealing surfaces 216 are initially machined to be parallel to the axis of rotation. In some embodiments, sealing surfaces 216 may be tapered. Sealing surfaces may have grooves 218, which are parallel, circumferential grooves formed in the sealing surface 216. Grooves 218 may be separated by ridges 220, each groove 218 forming a valley between ridges 220. In some embodiments, grooves 218 are filled, or partially filled, by a soft metal inlay 222. Inlay 222 has a lower hardness than seal lips 212 and thus is likely to deform and flow when outer sealing surface 216 is pressed against an adjacent surface. Inlay 222 could be made of a soft metal such as, for example, lead and tin.

Referring back to FIG. 8, the internal surface of each seal lip 212, the internal surface being the inner surface of the outer seal lip and the outer surface of the inner seal lip, may be tapered. Each seal lip 212 is narrowest at the tip and gradually becomes thicker towards the base of the u-shape. Guide ring 214 may have one or more catches 224. Catch 224 is a ridge or raised surface.

Upper ring 226, an axially moveable ring, comprises two downward-pointing radial energizing rings 228, 230. Energizing rings 228, 230 generally form a u-shape. Moveable inner energizing ring 228 has a tapered surface on the inner diameter, wherein the tip of inner ring 228 has a larger inner diameter than the base of inner ring 228. Similarly, the outer surface of moveable outer energizing ring 230 is tapered from the tip, which has the smallest outer diameter, to the base, which has the largest outer diameter. Inner energizing ring 228 or outer energizing ring 230 may have an internal barb 232, which is a surface protruding from the interior face of one of the rings.

Upper ring 226 may have one or more horizontal surfaces 234 at the end opposite the energizing rings. Upper ring 226 may have a threaded upper portion 236 having an outer diameter that is slightly smaller than the inner diameter of outer sleeve 129 and an inner diameter that is greater than the body of upper ring 226. The inner diameter of threaded upper portion 236 may have threads for threadingly engaging threads of a sleeve of adjustable casing sub 122 (FIG. 3). Other types of attachment may be used to engage upper ring 226. One of skill in the art will appreciate that upper ring 226 can be compressively engaged by other wellbore members without the use of a running tool.

Lower ring 237, which can be a stationary ring, is an annular ring rotated about the axis of the bore. Lower ring 237 has a pair of stationary energizing rings 238, 239 similar to the energizing rings 228, 230 of upper ring. Lower ring base 240 is generally flat, but may have chamfered edges. Upper ring 226 and lower ring 237 may be made entirely of metal.

In operation of the embodiment of FIGS. 8 and 9, trident seal assembly 210 is placed in housing annulus 130. Inner housing body 128 is lowered into position within outer sleeve 129. Barb 232 may engage catch 224 to prevent the separation of trident seal 210 and rings 226, 237 prior to setting the seal.

Compressive force is used to energize trident seal 210. The devices to provide compressive force to energize trident seal 210 are similar to the devices to provide compressive force to the quad seal assembly 136. When compressive force is applied to upper ring 226, upper ring 226 moves down relative to trident seal 210. The tapered surfaces on energizing rings 228, 230 of upper ring 226 engage tapered surfaces on trident seal lips 212. Seal lips 212 are forced apart to engage the surfaces of inner housing body 128 and outer sleeve 129.

As compressive force increases, trident seal 210 is pushed down, relative to inner housing body 128 and lower ring 237. Lower ring 237 remains fixed in place relative to inner housing body 128 because lower ring 237 is landed on horizontal surface 240. Tapered surfaces of lower ring 237 stationary energizing rings 238, 239 engage tapered surfaces of the second pair of sealing lips 212, forcing sealing lips 212 apart to compressively engage inner housing body 128 and outer sleeve 129.

Both pairs of sealing lips 212 may slide along inner housing body 128 and outer sleeve 129 after initially contacting the surfaces. The soft metal inlays 218 serve as lubrication to allow trident seals 210 to move along the sealing surfaces of inner housing body 128 and outer sleeve 129. When set, trident seal 210 forms a seal in both directions.

Referring to a second alternative embodiment in FIG. 10, u-shaped seal 240 is located in housing annulus 130 between inner housing body 128 and outer sleeve 129. U-shaped seal 240 is made up entirely of metal components and thus may withstand high temperatures and high pressures. These components comprise an outer wall or leg 242 and a parallel inner wall or leg 244, the legs 242, 244 being connected together at the bottom by a base 246 and open at the top 248. The inner diameter of outer leg 242 is radially spaced outward from the outer diameter of inner leg 244. This results in an annular clearance between legs 242, 244. The outer diameter surface of inner leg 244 may be generally smooth and has a taper wherein the outer diameter increases from the top 248 to the base 246. Similarly, the inner diameter of outer leg 242 may be generally smooth and is tapered, wherein the inner diameter is greatest at the top 248 and smallest at the base 246. Thus the annular gap between the legs 242, 244 is smallest at the base 246. The taper is generally consistent with a Morse Standard Taper, wherein the taper could be, for example, roughly less than or equal ⅝ inch per foot. Thus the angle formed between the inner surface of each leg 242, 244 and a line parallel to the axis u-shaped seal 240 is roughly 1 degree, 29 minutes. The angle may be larger or smaller, provided it establishes a self-holding taper.

Referring to FIG. 11, sealing surfaces 250 on the exteriors of legs 242, 244 may have grooves 252 separated by ridges 254. Grooves 252 are parallel circumferential grooves in sealing surface 250. Grooves may be filled with inlay 256. Inlay 256 is a generally soft metal which could comprise, for example, lead and tin.

Referring to FIG. 10, energizing ring body 258 is located in housing annulus 130. Energizing ring 260 is an annular ring that protrudes from energizing ring body 258. Energizing ring 260 may be employed to force legs 242, 244 radially apart from each other into sealing engagement with inner housing body 128 and outer sleeve 129. Energizing ring 260 has an outer diameter that will frictionally engage the inner diameter of outer leg 242 and an inner diameter that will frictionally engage the outer diameter of inner leg 244. The radial thickness of energizing ring 260 decreases from the point located at the top 248 of u-shaped seal 240 towards the base 246 of u-shaped seal. The sides of energizing ring 260 are generally straight and smooth. The taper of the sides of energizing ring 260 matches the taper of the interior surfaces of legs 242, 244—a Morse Taper that could be, for example, less than ⅝ inch per linear foot or roughly 1 degree, 29 minutes of angle.

The clearance between the inner surfaces of legs 242 and 244 and the surfaces of energizing ring 260 may be very tight due to the Morse Taper. To prevent the formation of a compressed fluid pocket between u-shaped seal 240 and energizing ring 260, one or more vent passages 262 may be located in energizing ring 260. Vent passage 262 is a passage having an opening near the tip of energizing ring 260 and a second opening at a location beyond the tips of legs 242, 244.

In some embodiments, elastomer seal 264 may be located in seal groove 266 on the exterior of energizing ring body 258. Similarly, elastomer seal 268 may be located in seal groove 270 on the interior of energizing ring body 258. Elastomer seals 264 and 268 are annular seals made of an elastomeric material. The exposed surfaces of elastomer seal 264, 268 protrude beyond the surface of energizing ring body 258 such that elastomeric seals 264, 268 press against the surfaces of inner housing body 128 and outer sleeve 129. In FIG. 10, the elastomeric seals 264, 268 are shown in an uncompressed state for clarity. In actual use, elastomeric seals 264, 268 will press against inner housing body 128 and outer sleeve 129 but will not extend through such surfaces. Thus elastomeric seals 264, 268, combined with energizing ring body 258, form a seal between inner housing body 128 and outer sleeve 129. The seal exists prior to setting u-shaped seal 240 and thus may prevent fluid or gas from passing between inner housing body 128 and outer sleeve 129 before energizing u-shaped seal 240.

Furthermore, the seal created by elastomer seals 264, 268 creates a redundant seal after u-shaped seal 240 is set. The energization and setting of u-shaped seal 240 provides a seal in both directions.

Energizing ring body 258 may have one or more horizontal surfaces 272 at the end opposite energizing ring 260. Energizing ring body 258 may have a threaded ring portion 274 having an outer diameter that is slightly smaller than the inner diameter of outer sleeve 129 and an inner diameter that is greater than the body of energizing ring body 258. The inner diameter of threaded ring portion 274 may have threads for threadingly engaging threads on running tool (not shown).

Downward force on energizing ring body 258 is used to set u-shaped seal 240. Downward force may be created in any of the manners described above regarding creating downward force on upper ring 148. When downward force is exerted on threaded ring portion 274 or horizontal surface 272, energizing ring body 258 moves down, relative to inner housing body 128, thus driving energizing ring 260 down. U-shaped seal 240 is unable to move down, relative to inner housing body 128, due to shoulder 194. Thus energizing ring 260 is forced down, between outer leg 242 and inner leg 244. Legs 242 and 244 are spread apart and pressed against the exterior surfaces of inner housing body 128 and outer sleeve 129. In some embodiments, inlay 256 deforms and flows within and between grooves 252.

While the invention has been shown or described in only some of its forms, it should be apparent to those skilled in the art that it is not so limited, but is susceptible to various changes without departing from the scope of the invention.

What is claimed is:

1. An apparatus for sealing between two tubular members, the apparatus comprising:
   a first and second inner annular sealing ring, each inner annular sealing ring having an inner sealing surface;
   a first and second outer sealing ring, the outer sealing rings being located opposite the inner sealing rings, each outer annular sealing ring having an outer sealing surface;
   an energizing ring having a first forcing cone and a second forcing cone, each forcing cone being an annular ring having an inner and an outer sloped surface, the inner and outer sloped surfaces diverging from each other from a tip of each forcing cone to a wide point of each forcing cone, the forcing cones protruding in opposite directions from a body of the energizing ring, the first forcing cone located radially between the first inner and outer sealing rings and the second forcing cone located radially between the second inner and outer sealing rings;
   an axially moveable ring having end surfaces for transferring axial force to the first inner and first outer sealing rings;
   a stationary ring having surfaces for transferring axial force to the second inner and second outer sealing rings; and
   wherein moving the axially moveable ring from a first axial position to a second axial position causes
   (a) the first inner and outer sealing rings to move axially from a first sealing ring axial position to a second sealing ring axial position relative to the first forcing cone, the sloped surfaces of the first forcing cone spreading the first inner and outer sealing rings radially apart as the first inner and outer sealing rings move to the second sealing ring axial position;
   (b) the energizing ring to move from a first energizing ring position to a second energizing ring position, thereby moving the second forcing cone axially from a first position to a second position relative to the second inner and outer sealing rings, the sloped surfaces of the second forcing cone spreading the second inner and outer sealing rings radially apart as the second forcing cone moves from the first position to the second position.

2. The apparatus according to claim 1, wherein the first and second forcing cones each have a bulbous point, the bulbous point having a wider cross section than the tip or a base of the forcing cones.

3. The apparatus according to claim 1, wherein the inner and outer annular sealing rings are metallic.

4. The apparatus according to claim 3, wherein the sealing surfaces comprise a plurality of ridges, each separated by one of a plurality of grooves.

5. The apparatus according to claim 4, further comprising an inlay located in at least one of the plurality of grooves, the inlay being a softer metal than the sealing rings.

6. The apparatus according to claim 1, wherein the second inner and second outer annular sealing rings do not move in an axial direction when energized by the energizing ring.

7. The apparatus according to claim 1, wherein the wellbore members comprise an outer tubular member and an inner tubular member concentrically located within the outer tubular member to define a housing annulus located therebetween, wherein the first and second inner annular seating rings form a seal against an outer diameter of the inner tubular member when the energizing ring is in the second energizing ring position and wherein the first and second outer annular sealing rings form a seal against an inner diameter of the outer tubular member when the energizing ring is in the second energizing ring position.

8. The apparatus according to claim 7, wherein the stationary ring is seated against a shoulder on the inner tubular member.

9. The apparatus according to claim 1, wherein the first inner and outer sealing rings move an axial distance that is greater than an axial distance between the first axial position and the second axial position of the energizing ring.

10. An apparatus for forming a seal between inner and outer tubular members, the apparatus comprising:
a metal annular sealing ring comprising a body having:
an upper inner sealing lip and an upper outer sealing lip extending therefrom and separated by an annular gap, the upper inner sealing lip positioned to form a seal against an outer diameter of the inner tubular member and the upper outer sealing lip positioned to form a seal against an inner diameter of the outer tubular member, and an upper annular guide ring protruding from the gap;
a lower inner sealing lip and a lower outer sealing lip extending therefrom and separated by an annular gap, the lower inner sealing lip positioned to form a seal against an outer diameter of the inner tubular member and the lower outer sealing lip positioned to form a seal against an inner diameter of the outer tubular member, and a lower annular guide ring protruding from the gap;
an axially moveable ring having a moveable inner and a moveable outer energizing ring;
a stationary ring having a stationary inner and a stationary outer energizing ring;
wherein axial movement of the axially moveable ring, from a first position to a second position, axially moves the annular sealing ring a distance less than the axial distance traveled by the axially moveable ring between the first position to the second position, and wherein the moveable energizing rings spread apart the upper inner and outer sealing lips from each other and the stationary energizing rings spread apart the lower inner and outer sealing lips from each other.

11. The apparatus according to claim 10, wherein the moveable inner and outer energizing rings define a u-shaped channel and at least a portion of the upper annular guide ring is positioned in the u-shaped channel.

12. The apparatus according to claim 11, further comprising a barb located on the axially moveable guide ring and catch located on the annular guide ring, wherein the catch engages the barb in the first position.

13. The apparatus according to claim 10, wherein the sealing lips comprise a plurality of ridges, each separated by one of a plurality of grooves.

14. The apparatus according to claim 13, further comprising an inlay located in at least one of the plurality of grooves, the inlay being a softer metal than the sealing lips.

15. The apparatus according to claim 10, wherein the stationary ring is seated against a shoulder located on the inner tubular member.

16. The apparatus according to claim 10, wherein the outer tubular member and the inner tubular member are concentrically located and define a housing annulus located therebetween, wherein the metal annular sealing ring is located within the housing annulus.

17. An apparatus for seating between inner and outer tubular members, the apparatus comprising:
a metal annular sealing ring comprising a body having an inner sealing lip and an outer sealing lip extending therefrom and separated by an annular gap, the inner seating lip positioned to form a seal against an outer diameter of the inner tubular member and the outer sealing lip positioned to form a seal against an inner diameter of the outer tubular member;
an energizing ring having an annular forcing cone protruding therefrom, the forcing cone being an annular ring having an inner and an outer sloped surface, the inner and outer sloped surfaces diverging from each other from a tip to a wide point of the forcing cone at a Morse taper, the forcing cone located radially between the sealing lips and the More taper locking the energizing ring in place when the annular sealing ring is in an energized state;
an elastomeric seal located in an annular groove on the energizing ring, the elastomeric seal positioned to form a seal against one of the tubular members; and
a vent passage through the forcing cone, the vent passage having a first opening located between the inner and outer sealing lips and a second opening located on an exterior surface of the energizing ring and spaced apart from the forcing cone.

18. The apparatus according to claim 17, wherein the sealing lips comprise a plurality of ridges, each separated by one of a plurality of grooves.

19. The apparatus according to claim 18, further comprising an inlay located in at least one of the plurality of grooves, the inlay being a softer metal than the sealing lips.

20. The apparatus according to claim 17, wherein a surface of the body is seated against a shoulder located on one of the inner tubular members.

* * * * *